United States Patent [19]

Backus et al.

[11] Patent Number: 5,017,143

[45] Date of Patent: May 21, 1991

[54] METHOD AND APPARATUS FOR PRODUCING SUBLIMINAL IMAGES

[75] Inventors: Alan Backus, Los Angeles; Ronald Popeil, Beverly Hills, both of Calif.

[73] Assignee: Popeil Industries, Inc., Beverly Hills, Calif.

[21] Appl. No.: 333,423

[22] Filed: Apr. 4, 1989

[51] Int. Cl.$^5$ .......................................... G09B 19/00
[52] U.S. Cl. .................................. 434/236; 434/307; 358/22; 358/92; 358/142; 358/182; 358/183
[58] Field of Search ............... 434/236, 307, 308, 309; 358/92, 93, 142, 22, 182, 183

[56] References Cited

U.S. PATENT DOCUMENTS

| | | | |
|---|---|---|---|
| 3,278,676 | 10/1966 | Becker | 434/236 X |
| 3,782,006 | 1/1974 | Symmes | 434/236 |
| 4,616,261 | 10/1986 | Crawford et al. | 358/142 X |
| 4,717,343 | 1/1988 | Densky | 434/236 |

*Primary Examiner*—Richard J. Apley
*Assistant Examiner*—J. L. Doyle
*Attorney, Agent, or Firm*—Lyon & Lyon

[57] ABSTRACT

A method and apparatus to produce more effective visual subliminal communications. Graphic and/or text images, presented for durations of less than a video frame, at organized rhythmic intervals, the rhythmic intervals intended to affect user receptivity, moods or behavior. Subliminal graphic images having translucent visual values locally dependent on background values in order to maintain desired levels of visual contrast.

5 Claims, 1 Drawing Sheet

METHOD AND APPARATUS FOR PRODUCING SUBLIMINAL IMAGES

BACKGROUND

1. Field of Invention

The field of this invention is the production and generation of visual subliminal images, and in particular, video subliminal images intended to alter behavior, attitudes, moods and/or performance.

2. Description of Prior Art

Video subliminal image generation products are popular and widely available. Subliminal herein refers to signals which are measurably present but below the level of human conscious perception. The video subliminal images are intended to aid viewers in: losing weight, reducing smoking, gaining self-confidence and much more.

Typical of such products are VCR tapes which may contain subliminal video and subliminal audio messages presented simultaneously against a backdrop of conventional clearly perceptible (i.e., supraliminal) scenes and sound tracks.

Typical clearly perceptible scenes and sound tracks on VCR self-help tapes include: a beach at sundown with crashing wave sounds, a sky full of clouds accompanied by the noise of wind rushing through pines, flowers bobbing in the wind backed with new-age music, etc.

Against these scenes, video subliminal messages are flashed or faded about once every 1 to 30 seconds. Subliminal messages are presented for durations ranging from a single television frame (1/30 of a second U.S. NTSC standard), to a up to about 5 seconds.

As presently known, these subliminal messages are composed solely of text presented at very faint levels. This text may appear as solid or airbrushed outlined letters and may contain from one to over five words.

Accompanying this text are generally subliminal verbal messages which are masked by the conventional clearly perceptible sound tracks they accompany.

These video self-help tapes have several disadvantages. First, the relatively long duration their text messages appear on a television screen (1/30 second or longer) means the messages must be presented at very faint visual contrast levels to remain subliminal. The human eye can clearly perceive a single television frame at 1/30 of a second, so making these messages have low contrast with their backgrounds is the only means to make them truly subliminal.

Hiding these subliminal text messages is complicated by their clearly perceptible backgrounds having many visual values which regularly change. To compensate for this, many of these tapes show scenes with broad areas of near uniform visual values and present their subliminal images using translucent text of a single intensity. Such tapes make no effort to locally adjust the values of their visual subliminal messages according to the backgrounds they are presented against. To simplify tape production still further, these tapes also keep such scenes on television screens for long durations.

Next, the relatively long durations these subliminal text messages appear on a television screen limits the number of messages which may be shown within a given period of time. By taking one or many full television frames to display a message, these systems limit the amount of information they can convey.

Next, the relatively long durations these subliminal text messages appear on television screens limits the frequencies at which such messages may be shown. This in turn limits the visual rhythms such messages may be shown at. Visual rhythms, like those created by strobe lights or rapidly changing movie scenes, have been shown to have a strong influence on human receptivity, moods and behavior. Current tapes make no attempt to use the rhythms at which they present their visual subliminal messages as a means of affecting user receptivity, moods or behavior. There are indications such subliminal visual rhythms may be used, among other things, to relax a user to be more receptive to subliminal visual and audio messages, and to alter viewer moods. Such organized subliminal visual rhythms may also be coordinated with organized rhythms in accompanying subliminal audio messages as well as with organized rhythms in accompanying clearly perceptible scenes and sound tracks to enhance the tapes' effects.

Finally, as indicated, the messages contained on today's self-help subliminal video tapes use only text to convey their messages. Text messages rely on a viewer's reading ability and are easily subject to misinterpretation. An example of such misinterpretation might be the message "less food is good" being quickly misread as "food is good" thus encouraging a viewer to eat instead of curbing excessive consumption. Such misinterpretation is exacerbated by the lack of visual obviousness inherent in video subliminal messages. The human mind interprets meaning from graphic images more quickly and fundamentally than from written words. None of today's self-help video tapes are understood to use graphic subliminal images to convey their messages.

SUMMARY OF THE INVENTION

The present invention is directed to a method and apparatus for producing more effective visual subliminal images. To that end, graphic and/or text images may be presented during a single video frame refresh, at organized rhythmic intervals intended to affect user receptivity, moods or behavior. Such images may have translucent or opaque visual values that are locally dependent on local background values in order to maintain desired levels of visual contrast.

Objects and Advantages

Accordingly, it is an object of the present invention to display visual subliminal images which convey information quickly and unambiguously.

A further object is to present visual subliminal images which are not dependent on the literacy or reading ability of a viewer.

A further object is to increase the number of visual subliminal messages which may be shown a viewer within a given period of time.

A further object is to increase the effectiveness of visual subliminal messages by organizing their presentation rhythms to alter viewer moods or behavior, or enhance viewer receptivity.

A further object is to increase the variety of scenes which may be used as effective backgrounds for visual subliminal messages.

A further object is to increase allowable visual contrast of subliminal messages with their backgrounds by reducing subliminal message appearance time.

Readers will find further objects and advantages of the invention from a consideration of the ensuing description of the preferred embodiment and the accompanying drawings.

DETAILED DESCRIPTION OF PREFERRED EMBODIMENT

Figure 1:
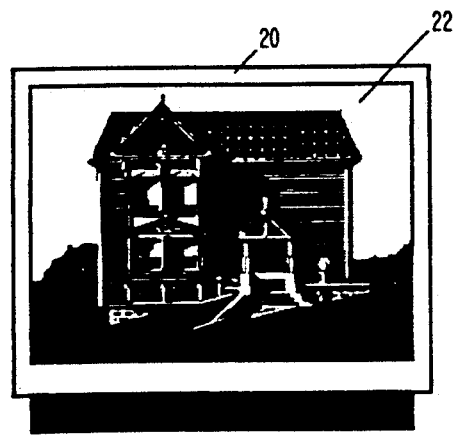
FIG. 1 is a diagrammatic representation of a television displaying a conventional clearly perceptible television image.
Figure 2:
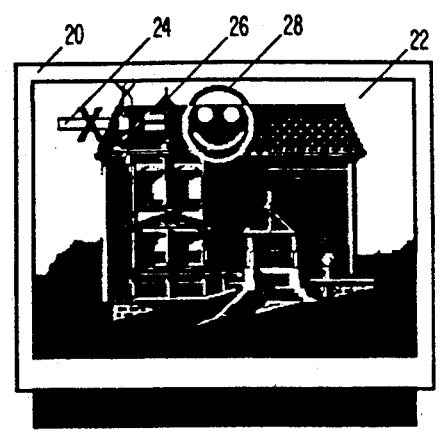
FIG. 2 is a diagrammatic representation of the television and clearly perceptible television image of FIG. 1 with the preferred embodiment's subliminal images overlaying the clearly perceptible television image.

The following description of the preferred embodiment is made with reference to the following drawing reference numerals:
22 television set
22 clearly perceptible television image
24 subliminal image—"x" out burning cigarette
26 subliminal image—"=" sign
28 subliminal image—happy face
30 horizontal raster boundaries
32 rasters generated in first image interlace
34 rasters generated in second image interlace
36 rasters blanked from "happy face" subliminal image
38 translucent dark rasters present in "happy face" subliminal image appearing against a light clearly perceptible background
40 rasters blanked from "happy face" subliminal image
42 translucent light rasters present in "happy face" subliminal image appearing against a dark clearly perceptible background Referring to FIG. 1 and FIG. 2, the subliminal images generated by the present invention's preferred embodiment are intermittently overlaid on a conventional clearly perceptible NTSC television image.

Figure 3:
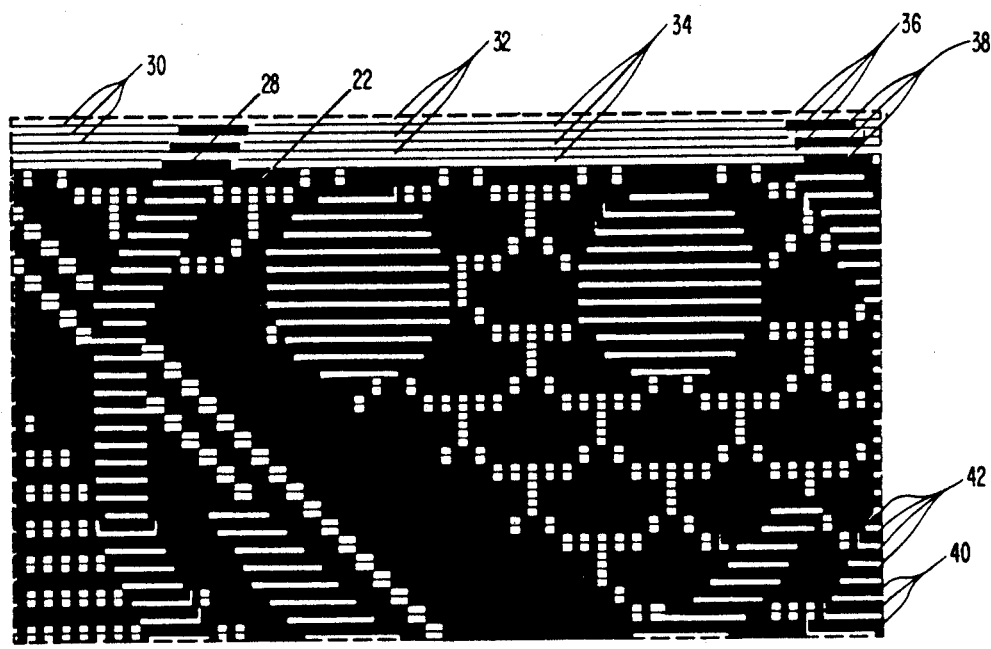
FIG. 3 is a diagrammatic representation of an enlarged portion of FIG. 2's television image.

The preferred embodiment's subliminal images, such as the ones shown in FIGS. 2 and 3, are intermittently presented. Intervals between subliminal images may range from no time, where different images are presented in directly adjacent frames or fields, up to several seconds or longer.

Each subliminal image or subliminal image combination (like the 3 images shown in FIGS. 2 and 3) is displayed within the interval of one video frame refresh (in the case of NTSC, within 1/30 second).

The preferred embodiment's subliminal images 24 26 28 are overlaid on a clearly perceptible television image 22 with the subliminal images having a plurality of missing rasters 36 40. In the case of NTSC standard images, every second raster 36 40 is missing from the subliminal images. This leaves subliminal images comprised of rasters on alternating horizontal scan lines 38 42. Some of these alternate subliminal image rasters may be blanked as well to make the image less perceptible where detail isn't required in the subliminal image.

Because each NTSC video frame is composed of 2 interlaced video fields, the preferred embodiment's subliminal image appears only in one video frame interlace, or for a duration of a 1/60 of a second video field. This is near the limit of conscious human ocular perception.

This short viewing duration means the preferred embodiment's subliminal images may be more visually obvious (i.e. have higher contrast with their backgrounds) during their short appearance than subliminal images seen for longer durations.

It also allows more subliminal images to be presented during any given period of time, when compared to subliminal images presented for longer durations.

Finally short presentation periods permit the subliminal images to be presented using a wide variety of organized presentation rhythms. These rhythms may be arranged to relax the viewer and make the viewer more receptive to the content of the subliminal messages or alter viewer moods or behaviors.

The preferred embodiment's subliminal images may locally vary in visual values depending on the local visual values of the clearly perceptible backgrounds against which they appear. This can mean that as a clearly perceptible background locally changes within a video frame from being dark gray to black, that the subliminal images overlaying the background will locally change from a translucent light gray to a translucent dark gray.

This can also mean that as a clearly perceptible background within a video frame locally changes from black to white, that the subliminal images overlaying the background may locally change from being translucently lighter than the image 42 to being translucently darker than the image 38. This is done to maintain the subliminal images at a desired level of visual contrast regardless of the local values of the clearly perceptible backgrounds against which the subliminal images appear.

The subliminal images may contain text in addition to, or in place of, the graphic communications images illustrated in FIGS. 2 and 3.

Also, one or a combination of images may be shown over an entire television screen, or in any portion thereof.

There are several ways to produce the preferred embodiment's subliminal images. One of these is to use a video editing studio. Here a tape containing the clearly perceptible images 22 to be used as background for the preferred embodiment's subliminal images 24 26 28 is modified using video animation equipment to isolate each video frame. An artist using a video frame editor adds the preferred embodiment's subliminal images 24 26 28 to each selected frame. Once all the subliminal messages are added, the master tape is duplicated to other VCR tapes.

Home or business users may then play the duplicate tapes back on VCRs for television viewing of both the clearly perceptible and subliminal images.

Many variations of this preferred embodiment may easily be envisioned by someone skilled in the art. As examples:

Any combination of features from the above could be used without others being present.

Instead of using a VCR tape duplicated from a studio master, other media could be used.

Also, the subliminal and background images could emanate locally from separate sources while in use. This would mean using a local video image combiner and possibly electronically monitoring the local visual values of the background images to determine the local subliminal image contrast values.

The subliminal images could have chroma and use color and/or color saturation to generate local frame contrast.

The subliminal image could be presented on raster systems having more than two interlaced fields per video frame. In this case, subliminal image rasters would be omitted which represented one or more refresh fields.

Successive identical subliminal images could be shown with only image shift being used to keep them from becoming perceptible through overlap.

Subliminal images could be animated by presenting changing subliminal images representing movement in adjoining or closely proximate video frames or fields. Each such animated frame could have some or all of the preferred embodiment's features.

Subliminal messages could be presented serially like the old Berma Shave road signs. Here individual frames would present words, phrases or graphic symbols which only make sense when linked together. An example of this is two proximate subliminal messages, the first saying "THIN" and the second saying "IS HEALTHY".

Also, the same subliminal message could be repeated several times within the sam video frame.

While embodiments and applications of this invention have been shown and described, it would be apparent to those skilled in the art that many more modifications are possible without departure from the inventive concepts herein. The invention, therefore, is not to be restricted except in the spirit of the appended claims.

We claim:

1. A method of producing subliminal images comprising the steps of:
    forming a subliminal raster image for video display for less than a full raster refresh cycle, and said image having a plurality of rasters missing from an otherwise complete image.

2. The method of claim 1 wherein said plurality of rasters missing includes substantially all rasters corresponding to a single raster field.

3. A method of producing subliminal images comprising the steps of:
    forming a subliminal raster image for a cathode ray tube device for less than a full raster refresh cycle, and said image having a plurality of rasters missing from an otherwise complete image.

4. The method of claim 3 wherein said plurality of rasters missing includes substantially all rasters corresponding to a single raster field.

5. A method of producing visual subliminal communications comprising presenting a plurality of subliminal visual communication messages serially, each said communication message being dependent on the rest to convey an intended message, and said plurality of subliminal visual communication messages presented serially being graphic images with variations between proximate images which represent perceived movement.

* * * * *